No. 881,880. PATENTED MAR. 10, 1908.
S. G. BROWN.
GALVANOMETER.
APPLICATION FILED APR. 7, 1903.

Witnesses:
James L. Norris
J. B. Keifer

Inventor
Sidney G. Brown
By
James L. Norris
Atty.

UNITED STATES PATENT OFFICE.

SIDNEY GEORGE BROWN, OF LONDON, ENGLAND.

GALVANOMETER.

No. 881,880.        Specification of Letters Patent.        Patented March 10, 1908.

Original application filed June 16, 1902, Serial No. 111,964. Divided and this application filed April 7, 1903. Serial No. 151,491.

*To all whom it may concern:*

Be it known that I, SIDNEY GEORGE BROWN, a subject of the King of Great Britain, residing at 4 Great Winchester, in the county of London, England, electrical engineer, have invented certain new and useful Improvements Relating to Galvanometers, of which the following is a specification.

This invention relates to improvements in galvanometers and has for its object to provide an efficient means for indicating whether a circuit in which it is included possesses self induction or capacity.

This application is a division of that filed June 16, 1902, Serial Number 111,964.

A galvanometer constructed according to this invention, is specially applicable for use in the manufacture of a cable or line for telegraphic and telephonic purposes, the self inductance of which is adapted to balance its capacity.

According to this invention the improved galvanometer, which I term a reaction galvanometer, comprises a wire coil delicately suspended as in an ordinary D'Arsonval galvanometer in the field of an electro-magnet excited by an alternating or fluctuating electric current so as to normally cut some of the magnetic lines of force. If plain resistance be included in the circuit of this coil, no reaction will occur between the amperes flowing in the said coil and the alternating magnetic field; the arrangement being such that the amperes will be completely out of phase and in quadrature with the alternating magnetism. If, however, capacity or induction be present in the circuit of the suspended coil, the amperes will be accelerated or retarded as the case may be, which will produce a movement of the said coil in the one direction for capacity and in the other direction for induction. The movements of this coil are preferably indicated by a spot of light reflected upon a stationary scale by means of a small mirror carried by the said coil. It will be understood that the term alternating or fluctuating electric current applies to any current which varies so as to induce a voltage in the coil.

By placing any apparatus, say, a length of cable or line possessing self-induction in a degree to balance its capacity, in the circuit of this suspended coil, the said coil will indicate whether induction or capacity predominates in the cable or line.

In order that the invention may be clearly understood and readily carried into effect, I will proceed to describe the same more fully with reference to the accompanying drawings in which:—

Figure 1:
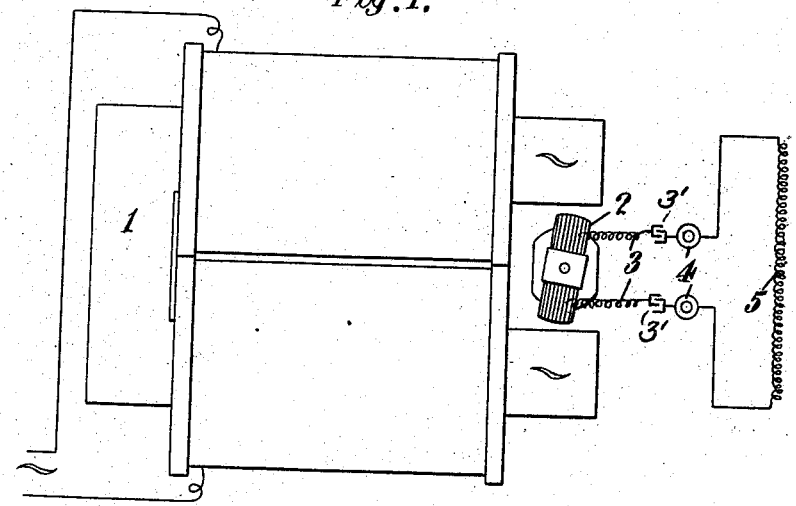
Figure 2:
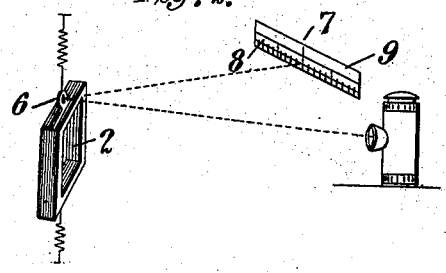
Figure 3:
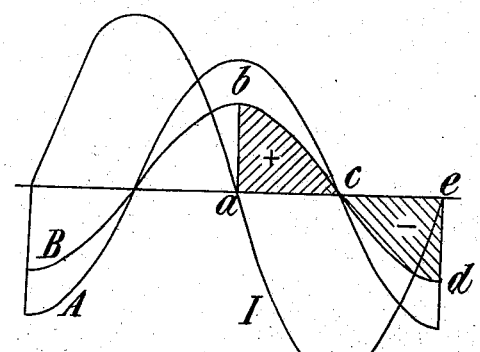

Figure 1 is a view in plan of the "reaction galvanometer". Fig. 2 illustrates, diagrammatically, the suspended coil, the mirror and the scale of the said galvanometer. Fig. 3 is a diagram of curves illustrating the operation of the said galvanometer.

1 is an electro-magnet excited by an alternating electric current of given frequency derived from any convenient source. Delicately suspended between the poles of said magnet is a coil 2 so placed as to be cut by some of the lines of force of the magnetic field and thereby to have voltage induced in the said coil. The opposite sides of the coil 2 are connected by fine wires 3, 3 with binding-screws 4, 4 to which are also connected the ends of a length 5 of cable or artificial line, the self-inductance or capacity of which it is desired to ascertain. Each leading-in wire is intersected by capacity as denoted by 3'. If the self-induction balances the capacity in the cable 5, there will be no movement of the coil 2 in the magnetic field, because there will be no reaction between the magnetic field and the amperes flowing in the coil 2; the latter being so arranged that the amperes set up therein will be exactly out of phase with the alternating magnetism. If, however, capacity or inductance be in excess in the cable or line 5, then the amperes in the coil 2 will be advanced or retarded and their reaction on the lines of force in the magnetic field will cause the coil to swing in the one direction or the other. Such movements of the coil 2 may be indicated by any convenient means, such as a reflector 6 carried by the coil and adapted to throw a beam of light upon a scale 7, of which the sides are graduated the one 8 for indicating capacity and the other, 9, for indicating induction. It is easy therefore, by studying the movements of the coil 2, to detect the presence of a preponderance of self-induction or of capacity in the said length 5 of cable or line and the value of such self-induction or capacity may be readily ascertained by comparison between any convenient standard, and the deflection so produced in the said coil. Similarly, the self-induction only of a conductor may be tested and compared with a standard for any given frequency or wave form of the alternating current of the magnet 1. Or the capacity alone of the cable can be tested.

The action of the galvanometer illustrated in Fig. 3, in which I represents the alternating magnetic effect from the magnet 1, A the electromotive force induced in the suspended coil 2, and B the ampere curve corresponding to the curve A. Normally, A and B are, as shown, in quadrature with regard to I and no torque is impressed on the coil 2. At this time the + and − shaded portions are equal in area, and it is owing to their effects balancing, that the coil remains unaffected. If, however, the cable 5 possesses a preponderance either of induction or capacity, then the curve B will be displaced one way or the other and the area bounded by the right angle $b\ a\ c$ and the curve line will either be greater or less than that inclosed by the right angle $c\ e\ d$ and consequently a turning movement will be imparted in the one direction or the other to the coil 2. The inductance of the coil may be balanced by placing capacity in the leading in wires.

Although I have described above the application of the invention to the manufacture of a particular form of cable it will be readily seen that the instrument may be advantageously applied to other uses where it is desired to indicate variations in capacity or inductance.

What I claim and desire to secure by Letters Patent of the United States is:—

A reaction galvanometer comprising an alternating or fluctuating current-exciting electro-magnet, a coil delicately suspended between the poles of said electro-magnet whereby voltage is inducted in the coil and the lines of force cut the wire coil, a cable or artificial line, wires connecting the cable or artificial line, binding screws for securing the said connecting wires, leading-in wires connecting said binding screws with said delicately suspended coil, said coil being mounted to move rotatively in a horizontal plane, a reflecting mirror mounted on said delicately suspended coil, and capacity in said leading-in wires.

In testimony whereof I have hereunto set my hand in presence of two subscribing witnesses this twenty third day of March 1903.

SIDNEY GEORGE BROWN.

Witnesses:
T. SELBY WARDLE,
WALTER J. SKERTEN.